Figure 4:
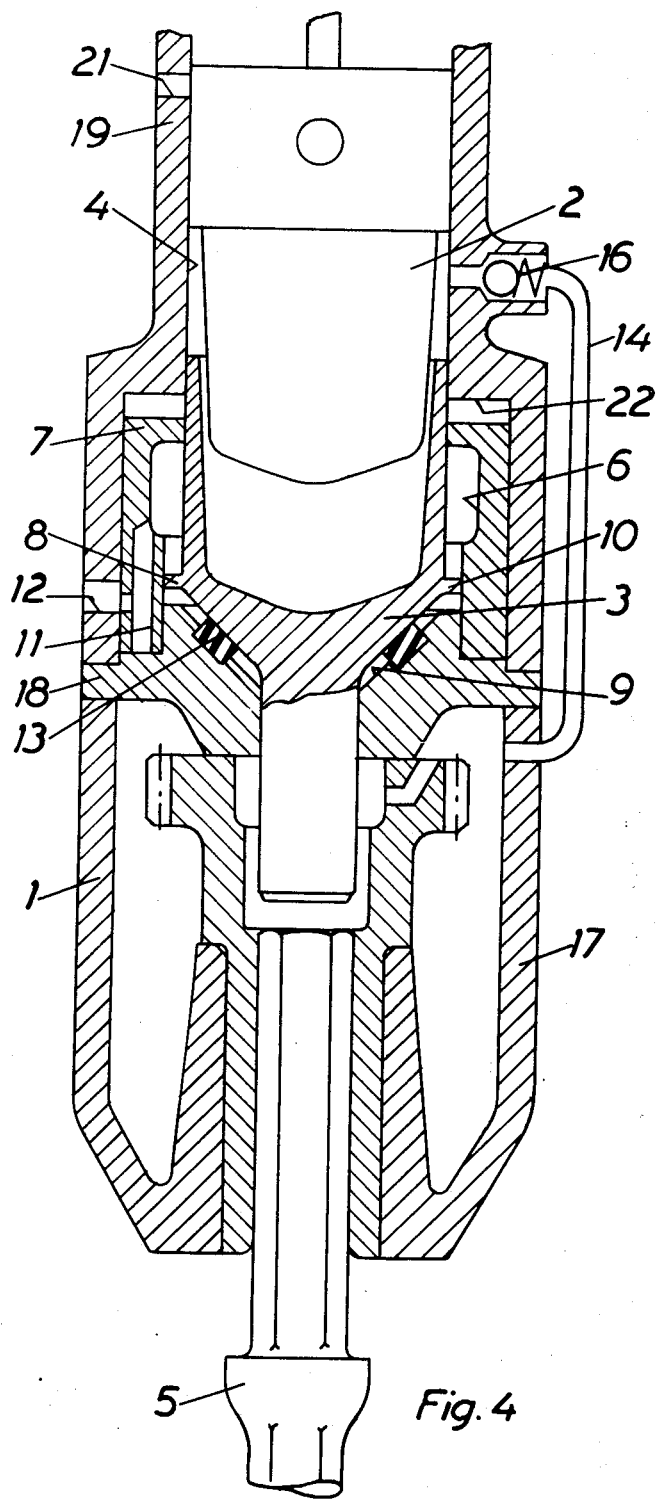

United States Patent [19]

Brannstrom

[11] 3,973,633
[45] Aug. 10, 1976

[54] HAMMER DEVICE

[75] Inventor: Kurt Osten Brannstrom, Saltsjo-Boo, Sweden

[73] Assignee: Atlas Copco Aktiebolag, Nacka, Sweden

[22] Filed: Feb. 12, 1975

[21] Appl. No.: 549,370

Related U.S. Application Data

[63] Continuation of Ser. No. 368,023, June 8, 1973, abandoned.

[30] Foreign Application Priority Data

June 30, 1972 Sweden.............................. 8600/72

[52] U.S. Cl................................. 173/75; 173/14; 173/118
[51] Int. Cl.² ....................................... E21B 21/00
[58] Field of Search............. 173/14, 16, 17, 57–59, 173/75, 76, 118, 134, 116, 118, 173

[56] References Cited
UNITED STATES PATENTS

| | | | |
|---|---|---|---|
| 1,662,801 | 3/1928 | Mercer | 173/75 X |
| 2,056,293 | 10/1936 | Rasch | 173/75 |
| 2,327,619 | 8/1943 | Brown | 173/59 |
| 3,133,600 | 5/1964 | Hochreuter | 173/75 |
| 3,570,608 | 3/1971 | Erma | 173/139 X |
| 3,685,593 | 8/1972 | Amtsberg | 173/14 |

*Primary Examiner*—Ernest R. Purser
*Assistant Examiner*—William F. Pate, III
*Attorney, Agent, or Firm*—Flynn & Frishauf

[57] ABSTRACT

A hammer mechanism is disclosed, which incorporates a hammer piston driven by a driving piston via a pressure-gas cushion in a working chamber. The hammer piston controls the transference of flushing gas from the working chamber to the tool during normal operation and has an extreme position in which the hammer piston does not interfere with the transference of flushing gas.

12 Claims, 4 Drawing Figures

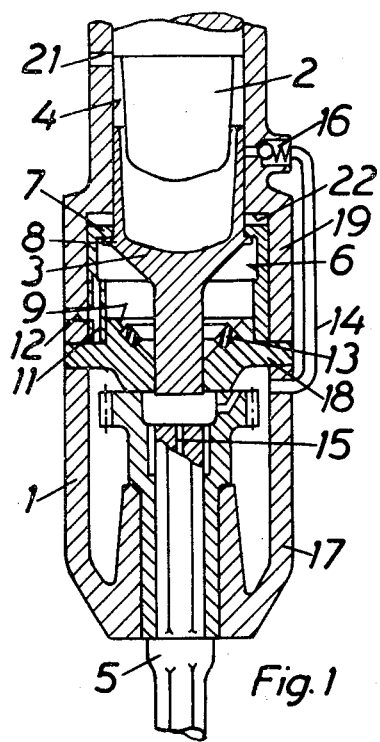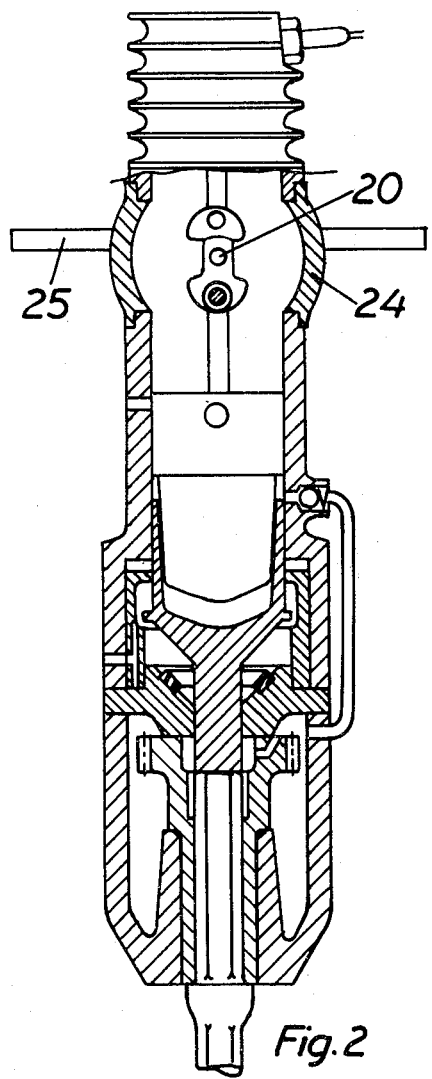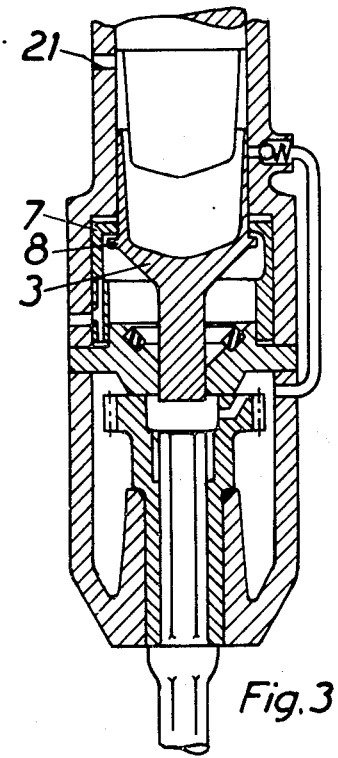
Fig. 1
Fig. 2
Fig. 3

HAMMER DEVICE

This is a continuation, of application Ser. No. 368,023, filed June 8, 1973 now abandoned.

The present invention relates to a hammer mechanism comprising a machine housing, a driving piston which is reciprocably movable in the machine housing, a hammer piston which is arranged to be driven towards a tool by the driving piston via a pressure-gas cushion in a working chamber, and a device for transferring pressure-gas from the working chamber to a channel in the tool.

In a known type of hammer mechanism (Swedish Pat. No. 319.134), the working chamber is continuously connected to the flushing channel of the drill-tool. Through this the maximum driving pressure on the hammer piston is limited. In order to achieve an acceptable impact energy the cross-sectional area of the transferring channel must be limited through which forceful flushing of the bore is made impossible.

The present invention aims at eliminating these drawbacks, which is achieved thereby that the hammer piston is arranged to control the pressure-gas transference when blows are delivered and has an extreme position in which the device for transferring pressure-gas is in continuous communication with the working chamber. Through this is achieved partly a greater impact energy because of a higher maximum driving pressure on the hammer piston and partly a possibility of forceful pressure-gas transference to the channel of the tool because the device for transferring pressure-gas can be given an arbitrarily large cross-sectional area.

An embodiment of the invention is described below with reference to the accompanying drawing on which FIG. 1 shows a hammer mechanism in section whereby the hammer piston is in position for delivering blows to the tool. FIG. 2 shows the hammer mechanism with the hammer piston in impact position. FIG. 3 shows the hammer mechanism with the hammer piston in that position which it takes when its kinetic energy during the return has been transferred to the impact ring. FIG. 4 shows the hammer mechanism on a larger scale with the hammer piston in an extreme position.

The shown hammer mechanism comprises a machine housing 1, which consists of a lower part 17, an intermediate part 18, and an upper part 19. A driving piston 2 is arranged in the machine housing 1 and driven in a reciprocating movement by a crankshaft 20 which suitably is driven by a combustion engine. In the machine housing 1 there is furthermore a hammer piston 3 which is provided with impact means 8. The hammer piston 3 is driven by the piston 2 towards the tool 5 via a pressure-gas cushion in the working chamber 4. The working chamber 4 is supplied with air via an air intake 21. Through draining pressure-gas from the working chamber 4 through a device 14 meant for conducting flushing air to a channel 15 in a tool 5, the return of the hammer piston 3 after the impact against the tool 5 is secured. The return takes place because the driving piston 2 sucks the hammer piston 3 back. An impact ring 7 is arranged concentrically with an glidably around the hammer piston 3 for cooperation with the impact means 8. The impact ring 7 is pressed forward by the pressure in the chamber 22. The chamber 22 is supplied with air from the working chamber 4 via a thin slot arranged between the machine housing 1 and the hammer piston 3. The room 6 continuously communicates with the atmosphere via channels 11, 12 arranged in the impact ring 7 respectively the machine housing 1. The room 6 at its front end provided with a damping chamber 9 which is defined by the machine housing 1, the front part of the hammer piston 3, and the front part of the impact ring 7. A slot 10 is arranged between the impact means 8 of the hammer piston 3 and the front part of the impact ring 7. As shown in FIG. 2 the hammer mechanism is a part of a rock-drilling machine 24 which is provided with handles 25. The slot 10 is so dimensioned that the damping chamber 9 stops the hammer piston 3 essentially without rebound when the rock-drilling machine 24 is lifted by means of the handles 25. In this operation the hammer piston 3 and the tool 5 are brought to take the positions shown in FIG. 4, through which the driving piston 2 is unable to suck the hammer piston 3 back. In the front part of the damping chamber 9 a ring 13 of elastic material is arranged for absorbing that part of the kinetic energy of the hammer piston 3 which may remain when the hammer piston 3 reaches the bottom of the damping chamber 9. When the hammer piston 3 is in the position shown in FIG. 4 the channel 15 in the tool 5 is supplied with approximately double the amount of flushing air as is normal operation. The check-valve 16 has the purpose of preventing recirculation of flushing air. When the hammer mechanism works in a normal way the hammer piston 3 controls the transference of flushing air.

The shown hammer mechanism works in the following way: When the driving piston 2 is driven downwards from the position shown in FIG. 1 it closes the air intake 21 of the working chamber 4. The air in the working chamber 4 is compressed, through which the hammer piston 3 is driven towards the tool 5 and impacts it, which is shown in FIG. 2. The hammer piston 3 hereby produces a connection between the working chamber 4 and the device 14 for transferring pressure-gas to the channel 15 in the tool 5. Because of the recoil from the tool 5 the connection is closed by the hammer piston 3. When the driving piston 2 returns the hammer piston 3 is sucked back and hits with the impact means 8 against the impact ring 7 to which the hammer piston 3 transfers all of its kinetic energy. Directly before this happens the driving piston 2 opens the air intake 21. Through this the hammer piston 3 is given a well-defined stop position, shown in FIG. 3. The impact ring 7 is retarded and returned by the pressure in the chamber 22. In order to achieve a more forceful airflow to the channel 15 in the tool 5 for improved flushing of a bore, the machine 24 is lifted by means of the handles 25. Through this the tool 5 sinks to the position shown in FIG. 4. Because of the chosen dimensioning of the slot 10 and the continuous communication between the room 6 and the atmosphere, the hammer piston 3 is stopped by the damping chamber 9 essentially without rebound and stops in the position shown in FIG. 4. Through this continuous communication between the working chamber 4 and the device 14 for transferring pressure-gas to the channel 15 is achieved. The check-valve 16 prevents recirculation of flushing air. The above described and on the drawing shown embodiment of the invention is only to regard as an example which can be modified within the scope of the subsequent claims.

What I claim is:

1. A hammer mechanism for use with a tool having channel therein, the hammer mechanism having a normal working mode of operation and a continuous flushing mode of operation, comprising:

a machine housing (1) having a working chamber (4) therein;

a driving piston (2) which is reciprocably movable in the machine housing (1);

means coupled to said driving piston for reciprocably moving said driving piston (2) in the machine housing (1) to create a pressure-gas cushion in the working chamber (4);

a hammer piston (3) in the housing (1) and which is arranged to be driven towards a tool (5) by the driving piston (2) via said pressure-gas cushion in the working chamber (4) and being selectively movable to a resting position at an extreme end position in the housing to define said continuous flushing mode, said extreme resting position being outside the normal range of operation of the driving piston (2) when the hammer mechanism is operating in said working mode;

means (14) for transferring pressure-gas from the working chamber (4) to a channel (15) in the tool (5);

the hammer piston (3) including cut-off means cooperating with the pressure-gas transferring means (14) for selectively turning on and cutting off the pressure-gas transference during the normal working mode of operation of the hammer mechanism, the hammer piston (3) cutting off the pressure-gas transference to the tool channel (15) during a major portion of the working stroke of the hammer piston;

means including a damping chamber (6) cooperating with and stopping the hammer piston (3) in said extreme resting position during the continuous flushing mode of operation; and means including said hammer piston cut-off means for rendering the pressure-gas transferring means (14) in continuous communication with the tool channel (15) and the working chamber (4) when the hammer piston (3) is in said extreme resting position so that the pressure created in the working chamber (4) by the driving piston (2) generates a flushing flow of pressure gas to thereby provide said continuous flushing of the tool channel (15).

2. A hammer mechanism according to claim 1 wherein said damping chamber includes means for stopping the hammer piston essentially without rebound when it exceeds its normal working stroke in order to take its extreme position.

3. A hammer mechanism according to claim 2, wherein said hammer piston includes impact means thereon; further comprising an impact ring arranged concentrically with and glidably around the hammer pistons for cooperation with said impact means on the hammer piston; and wherein the damping chamber is defined by the machine housing, the front part of the hammer piston, and the front part of the impact ring, the damping chamber being in continuous communication with the atmosphere.

4. A hammer mechanism according to claim 3, comprising:

a slot which is arranged between the hammer piston and the impact ring, and channels in the impact ring and the machine housing, said damping chamber communicating with the atmosphere via the slot and the channels.

5. A hammer mechanism according to claim 2, comprising a ring of elastic material arranged in the front part of the damping chamber.

6. A hammer mechanism according to claim 1, wherein the pressure-gas transferring means comprises a check-valve.

7. A hammer mechanism according to claim 3 comprising a ring of elastic material arranged in the front part of the damping chamber.

8. A hammer mechanism according to claim 4 comprising a ring of elastic material arranged in the front part of the damping chamber.

9. A hammer mechanism according to claim 4 wherein said pressure-gas transferring means includes means forming a channel, one end of which opens into the portion of the housing in which the hammer piston is located, said opening being located such that a wall of said hammer piston blocks said opening during a major portion of the working stroke of the hammer piston, said opening being unblocked and in communication with said working chamber when said hammer piston is in said extreme resting position during said flushing mode of operation.

10. A hammer mechanism according to claim 1 wherein said hammer piston is moved away from the tool after being driven toward the tool via suction created in the working chamber by the driving piston.

11. A hammer mechanism according to claim 10 comprising means in said housing for preventing said hammer piston from being moved away from said extreme resting position under the influence of said suction.

12. A hammer mechanism according to claim 11 wherein said preventing means comprises means for venting the damping chamber to the atmosphere when the hammer piston is in said extreme resting position.

* * * * *

UNITED STATES PATENT AND TRADEMARK OFFICE
CERTIFICATE OF CORRECTION

PATENT NO. : 3,973,633
DATED : August 10, 1976
INVENTOR(S) : Kurt O. BRANNSTROM

It is certified that error appears in the above-identified patent and that said Letters Patent are hereby corrected as shown below:

Column 4, line 3, change "pistons" to --piston--.

Signed and Sealed this

Second Day of November 1976

[SEAL]

Attest:

RUTH C. MASON
*Attesting Officer*

C. MARSHALL DANN
*Commissioner of Patents and Trademarks*